United States Patent [19]

Solhjell

[11] Patent Number: 4,476,503
[45] Date of Patent: Oct. 9, 1984

[54] METHOD FOR THE RECOGNITION OF AN EDGE OF A MAGNETIC MEDIUM AND A DEVICE FOR IMPLEMENTATION OF THE METHOD

[75] Inventor: Erik Solhjell, Oslo, Norway

[73] Assignee: Tandberg Data A/S, Oslo, Norway

[21] Appl. No.: 363,492

[22] Filed: Mar. 30, 1982

[30] Foreign Application Priority Data

Mar. 31, 1981 [DE] Fed. Rep. of Germany ....... 3112886

[51] Int. Cl.³ .......................... G11B 5/56; G11B 21/00
[52] U.S. Cl. ........................................ 360/75; 369/56; 369/57
[58] Field of Search ................. 360/77, 71, 70, 72.1, 360/72.2, 58, 109, 75; 369/55, 56, 57

[56] References Cited

U.S. PATENT DOCUMENTS

| 3,524,196 | 8/1970 | Church ................................. 310/8 |
| 3,678,220 | 7/1972 | Luhrs ............................. 179/100.2 S |
| 4,071,856 | 1/1978 | Kihara et al. ...................... 360/77 X |
| 4,349,849 | 9/1982 | Satoh ..................................... 360/71 |
| 4,395,740 | 7/1983 | Yuen et al. .......................... 360/72.2 |

FOREIGN PATENT DOCUMENTS

| 627373 | 5/1963 | Belgium . |
| 32660 | 7/1981 | European Pat. Off. . |
| 1478339 | 6/1977 | United Kingdom . |
| 2008290 | 5/1979 | United Kingdom . |

OTHER PUBLICATIONS

Patents Abstracts of Japan, vol. 2, Nr. 62, 5/11/78—Japanese Patent 53-53-27418 on p. 1943 E 78.
Patents Abstracts of Japan, vol. 5, Nr. 5, 1/14/81—p. 677 (p-44) Japanese Patent 55-135332.
IBM Technical Disclosure Bulletin, vol. 9, Nr. 11, 4/67, pp. 1499-1500, J. J. Hagopian.
Patents Abstracts of Japan, vol. 5, Nr. 1, 1/8/81, p. P-43-673-Japanese Patent No. 55-132522.
Patents Abstracts of Japan, vol. 1, Nr. 152, 12/7/77-p. 8010-E-78-Japanese Pat. No. 53-98804.
IBM Technical Disclosure Bulletin, vol. 20, Nr. 7, 12/77-pp. 2821-2822-V. R. Witt.
IBM Technical Disclosure Bulletin, vol. 20, Nr. 9, 2/78-pp. 3673-3674-D. R. McEfee.

Primary Examiner—George G. Stellar
Attorney, Agent, or Firm—Hill, Van Santen, Steadman & Simpson

[57] ABSTRACT

When setting a write gap or a read gap to a recording track on a magnetic medium, an edge of the medium is selected as a starting point, proceeding from which the write and read means are displaced in fixed track spacings. Appropriate method steps are:
(a) generating a write signal with the write means of a read and write system exhibiting a write and a read means;
(b) moving the medium from the write means toward the read means;
(c) executing a read operation with the read means which generates a read signal;
(d) comparing the read signal to a reference value identifying the write signal; and
(e) outputting a detector signal indicating the edge when the write signal has been identified.

14 Claims, 13 Drawing Figures

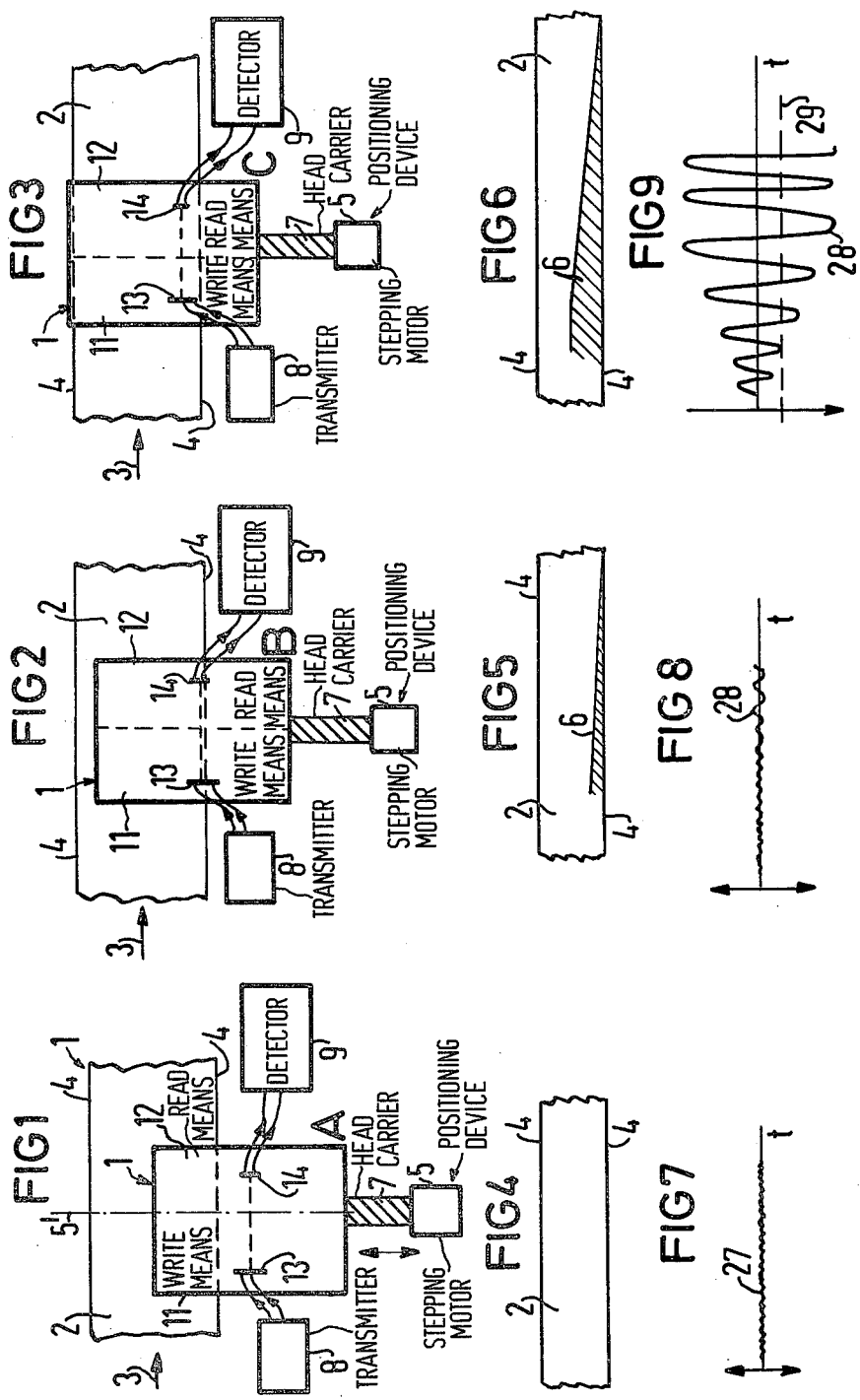

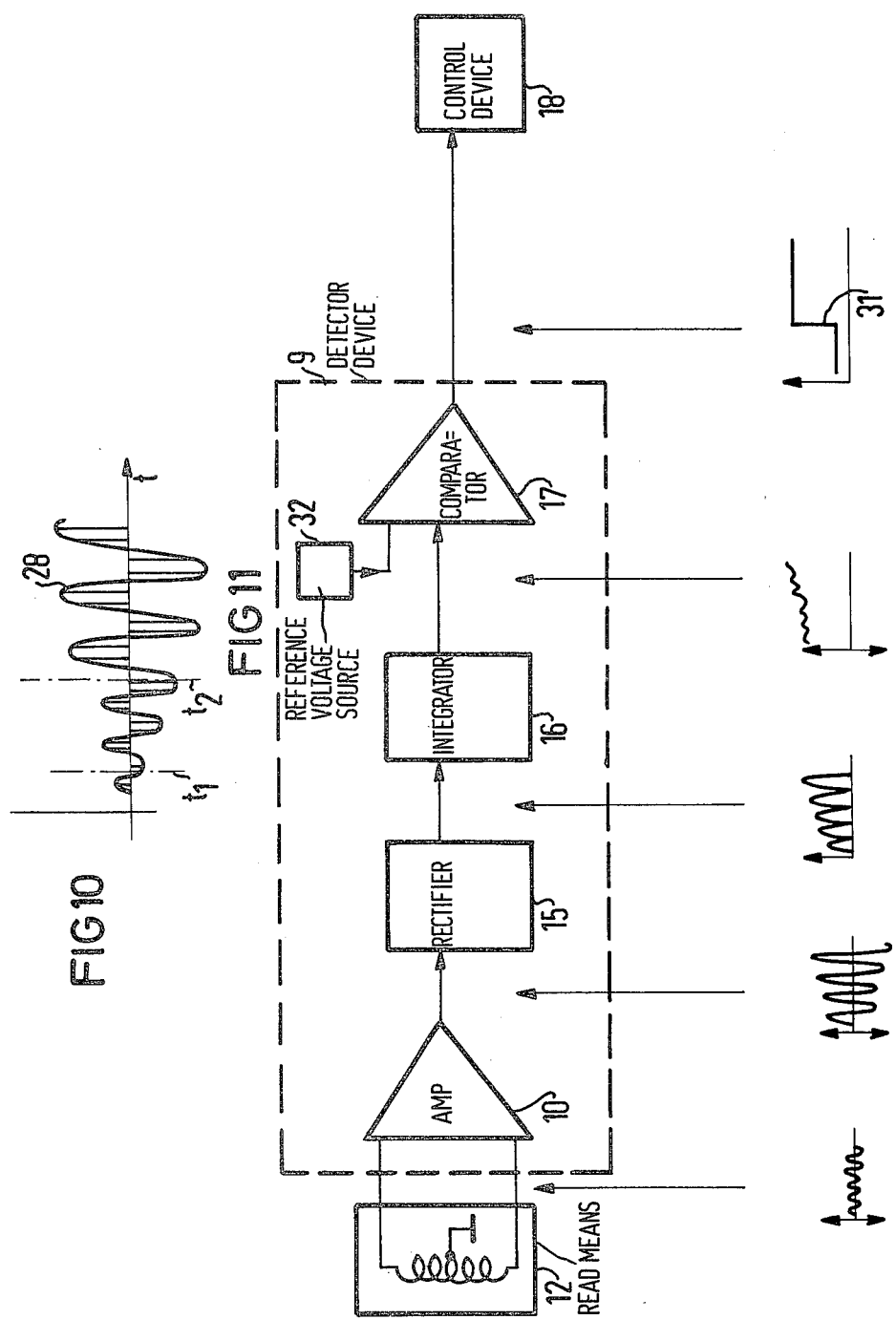

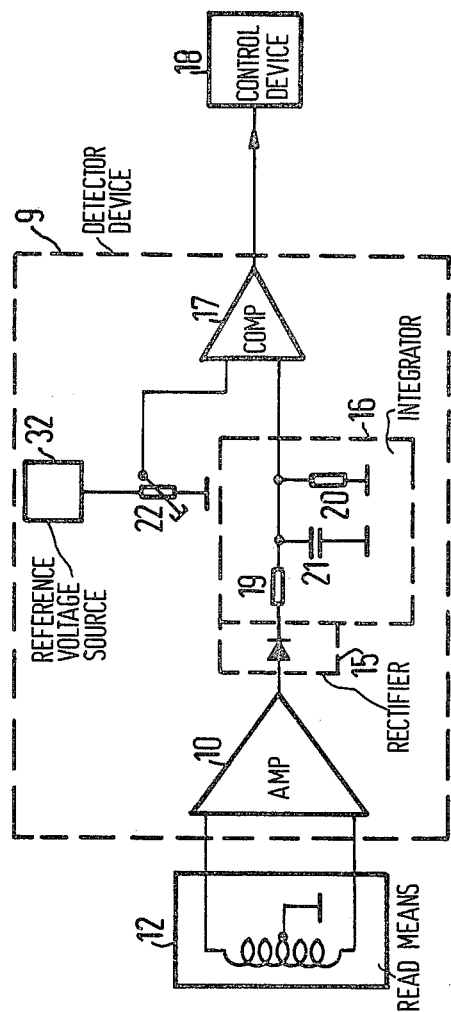
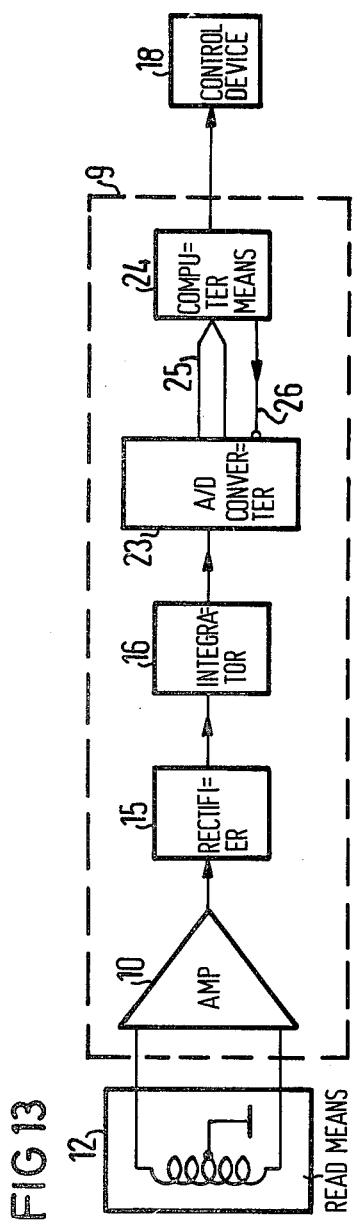

METHOD FOR THE RECOGNITION OF AN EDGE OF A MAGNETIC MEDIUM AND A DEVICE FOR IMPLEMENTATION OF THE METHOD

BACKGROUND OF THE INVENTION

The invention relates to a method for the recognition of an edge of a magnetic medium and a device for implementation of the method.

As is known, information can be inscribed upon and read out from a magnetic medium, for example a magnetic disk or a magnetic tape, by means of generating magnetic flux changes. For this purpose, a read and write system, for example a magnetic head with a write and read gap, can be employed. During inscription, electric signals are converted into a change of the magnetic flux by means of induction at the write gap or, respectively, changes of magnetic flux on the medium are sensed at the read gap and are converted into electrical signals. In comparison to the surface of the medium, the write gap and the read gap can be small, so that a plurality of tracks which arise given movement of the medium past the gap, can be recorded. When these tracks are read, for example with a read and write system which differs from the one used for recording, it is essential that the read gap be precisely disposed over the track produced by the write head.

Given a magnetic tape, a method of aligning the read gap to the track recorded by the write gap consists of employing the edge of the magnetic tape as a reference. Already during recording, the write gap at the transition from one track to another is offset, proceeding from the edge, by a fixed track spacing. In the transition from one track to another, the read gap, proceeding from the edge, is likewise offset by this track spacing. The initial position of the write and read system at the reference point can be manually fixed, for example as a function of a tape guidance. However, it is a disadvantage that positional changes of the sensing system or of the tape guidance and manufacturing tolerances cannot be taken into consideration, since the adjustment is usually only undertaken once.

SUMMARY OF THE INVENTION

It is an object of the invention to specify a method which makes the manual setting of the read and write system superfluous, and with which a setting to an edge of a magnetic medium is possible at every write or, respectively, read operation.

Given a method for recognizing an edge of a magnetic medium, this object is achieved by means of the following steps:

(a) generating a write signal with the write means of a read and write system exhibiting a write means and a read means;

(b) moving the medium from the write means toward the read means;

(c) executing a read operation with the read means which generates a read signal;

(d) comparing the read signal with a reference value identifying the write signal; and (e) outputting a detector signal indicating the edge when the write signal is identified.

This method offers a series of advantages. Since the read and write system can be very precisely aligned to an edge, it is possible to record a plurality of tracks on the medium which lie very close to one another. Since the actual position of the edge at the moment can always be determined, errors which depend on temperature, atmospheric humidity, manufacturing tolerances, etc., are avoided.

BRIEF DESCRIPTION OF THE DRAWINGS

FIGS. 1 through 3 show a fundamental arrangement of a read and write system at a magnetic tape;

FIGS. 4 through 6 show a part of the magnetic tape;

FIGS. 7 through 10 respectively show a progression of a read signal;

FIG. 11 shows a fundamental circuit arrangement for the implementation of the method; and FIGS. 12 and 13 show a circuit arrangement according to FIG. 11.

DESCRIPTION OF THE PREFERRED EMBODIMENTS

FIG. 1 shows a read and write system 1 which exhibits a write means 11 provided with a write gap 13 and a read means 12 provided with a read gap 14. A magnetic medium designed as a tape 2 with two edges 4 moves in a moving direction 3 from the write means 11 to the read means 12. Both exhibit a respective induction winding. In the case of the write means 11, this is connected to a transmitter 8 which generates a write signal. In the case of the read means 12, it is connected to a detector means 9. The write/read system is disposed on a positioning device 5, 7 with which it can be moved in a straight line 5 proceeding nearly perpendicularly at right angles relative to the moving direction 3. The positioning device consists of a head carrier 7 driven by a stepping motor 5. The read gap 14 is shorter than the write gap 13 in order to assure that it is disposed over the track recorded by the gap 13. The read and write system 1 is situated in a position A in which the write gap 13 and the read gap 14 lie next to the tape 2.

In FIG. 2, the sensing device is situated in a position B in which the write gap 13 and the read gap 14 lie exactly over the edge 4. In FIG. 3, the write gap 13 and the read gap 14 lie completely over the tape 2 (position C).

A tape 2 is illustrated in FIG. 4 on which no write signal is recorded. In FIG. 5, a narrow area 6 close to the edge 4 is inscribed with a write signal. In FIG. 6, this area 6 is broader than that illustrated in FIG. 5. It corresponds to the width of a track recorded by the write gap 13.

FIG. 7 shows the progression of a read signal 28 over time t which is generated by the read means 12 when reading a tape 2 in position A. The read signal 28 is a voltage value proportional to a magnetic flux change. A small flux change generates a read signal 28 with a small amplitude whereas a large flux change results in a large amplitude. The amplitude is zero when no flux change exists. FIG. 8 shows the progression of the read signal 28 which is generated when reading the tape in position B. FIG. 9 shows the progression when reading in position C. The voltage path is illustrated in digital form in FIG. 10. It is interrogated at a first point in time t1 and at a second point in time t2.

The method is described below. In position A, a write signal is forwarded with a fixed frequency from the transmitter 8 to the write means 11 while the tape 2 moves and a read operation is executed by the read means 12. Since the write gap 13 lies next to the tape 2, no flux change is generated thereon. I.e., the tape 2 is empty (FIG. 4). Of course, a noise signal can be present.

The read signal 28 exhibits only a noise level 27 (FIG. 7).

The read and write system 1 is then moved either continuously or stepwise toward the tape 2. As soon as the write gap 13 transgresses the edge 4, a write signal is recorded on the tape 2 (position B). The recording ensues in that area 6 which becomes all the broader the further the write gap 13 is moved over the tape 2. The amplitude of the read signal 28 becomes all the greater the broader this area 6 is. A maximum of the amplitude is reached when the write gap 13 is completely situated over the tape 2 (position C), since the area 6 is also broadest then. The area 6 corresponding to the position B is illustrated in FIG. 8 and that corresponding to the position C is illustrated in FIG. 9.

In the transition from position A into position C, i.e. when crossing the edge 4, a significant change of the read signal 28 thus ensues, so that this change can be employed for recognizing the edge 4. The recognition of this change corresponds to the identification of the write signal recorded on the tape 2.

One method (static method) to determine the change of the read signal 28 is to compare the read signal 28 to a constant, prescribed reference value 29. As soon as the read signal 28 exceeds the reference value 29, the write signal has been identified.

Another method (dynamic method) is to interrogate the amplitude of the read signal 28 at a specific point in time (first point in time t1) and to store it and to compare it to the amplitude of a read signal 28 read at a later point in time (second point in time t2). By so doing, a change of the amplitude which has occurred in this time span can be perceived. The difference of the two amplitude values is formed and is compared to a prescribed reference value 29. When the difference is greater than the reference value 29, then the write signal has been identified. Of course, the read and write system 1 can also be moved in the reverse direction from position C to position A. As soon as the write signal has been identified, or respectively the change has been perceived, a detector signal 30 indicating the edge 4 is emitted by the detector device 9. The write gap 13 and the read gap 14 are then situated precisely over the tape edge 4. A measured value corresponding to the position of the read and write system is then formed. It indicates the position of the edge 4. On the basis of this, the individual tracks on the tape 4 can be precisely approached with the positioning device 5, 7.

Both edges 4 of the tape 2 can also be determined. When a second mean value is formed from the two measured values thereby obtained, the center of the tape is therewith determined. It can likewise be employed as the basis for homing in on the individual tracks.

The dynamic method has the advantage over the static method since errors which depend, for example, on temperature differences or differences in the magnetic media, etc., are reduced.

The precision of the method can be further increased when the read and write system 1 is moved over the tape 2 and subsequently is again moved back until it is no longer situated over the tape 2. A first mean value which fixes the position of the edge 4 is formed from the two measured values thereby identified. A device for implementing the method is described below.

FIG. 11 shows the read means 12 whose winding is connected to the control device 18 via a detector device 9. The detector device 9 consists of an amplifier 10 amplifying the read signal 28 whose output is connected via a rectifier 15 and a following integrator 16 to an input of a comparator 17. A reference voltage source 32 is adjacent to its other input. Its voltage serves as reference value 29.

The detector device 9 generates the detector signal. It consists of an edge 31 in the output signal of the detector device 9. The detector signal is generated when the write signal is perceived on the tape 2, i.e. when the change of the amplitude of the read signal 28 described above is perceived. The amplified read signal 28 is integrated in order to reduce errors which can arise due to so-called "dropouts". The control device 18 controls the output of the write signal and the movement of the positioning device 5, 7. Respective progressions of the output signals are illustrated at the connecting lines.

The circuit arrangement of the detector device 9 for application to the static method is illustrated in FIG. 12. The rectifier 15 consists of a diode. The integrator 16 consists of a first resistor 19 connected between an input and output of the integrator. To one end of resistor 19 is connected a parallel connection of a second resistor 20 and a capacitor 21, the other end of said parallel connection being connected to ground. The reference voltage source 32 is connected to the comparator 17 via a third variable resistor 22. The reference value 29 is determined at the third resistor 22.

In case the dynamic method is employed, the detector device consists of an analog-to-digital converter 23 digitizing the read signal which is connected to the amplifier 10 via a rectifier 15 and an integrator 16. The output of said analog-to-digital converter 23 is connected to a computational means 24 via a bus line 25 which is eight bits wide and via a selection line 26. At a first point in time t1, a selection signal is forwarded onto the selection line 26 by said computational means 24, whereby the digitized read signal 28 is interrogated and stored. After a prescribed time (point in time t2), the digitized read signal 28 is interrogated a second time and the difference of the two is formed. Moreover, a reference value is made available to which the difference is compared. The detector signal is emitted when the difference is greater than the reference value.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A method for recognizing an edge of a magnetic medium, comprising the steps of:
   (a) generating a write signal with a write means of a read and write system formed of said write means and a read means, said read means and write means being provided as a movable head;
   (b) moving the medium from the write means toward the read means;
   (c) executing a read operation with the read means so as to detect presence or absence of a read signal while moving the head toward an edge of the magnetic medium;
   (d) comparing the read signal to a reference value to identify presence or absence of the read signal; and
   (e) utilizing the identification to determine the edge of the magnetic medium, said read signal not being present when the write means is beyond the medium edge and not over the medium.

2. A method according to claim 1 including the steps of moving the read and write system along a straight line proceeding substantially perpendicularly relative to a moving direction of the medium, and performing step of (a) through (d) repeatedly during the movement.

3. A method according to claim 2 wherein the movable head is moved until it is over the medium.

4. A method according to claim 2 wherein the movable head is moved until it is removed from the medium.

5. A method according to claim 1 wherein the reference value is constant.

6. A method according to claim 1 wherein at a first point in time a read signal value corresponding to the read signal is stored in a storage means; a read signal value of the read signal occurring at a later second point in time is measured; and a difference of the two read signal values is compared to the reference value.

7. A method according to claim 1 including the step of storing a position value indicating a position of the read and write means movable head indicating the edge location.

8. A method according to claim 1 including the steps of forming a measured value indicating a position of the medium edge.

9. A method according to claim 2 wherein the read and write system is moved on the straight line until it is over the medium and back again until it is no longer situated over the medium; that, a respective position value corresponding to each pass over the edge is formed; and that a first mean value is formed from the two position values.

10. A method according to claim 1 wherein the medium comprises a tape; the head is moved over an entire width of the tape and beyond upper and lower edges; a positional value determining the upper edge and a positional value determining the lower edge are identified; and a mean value is formed from the two positional values.

11. A method for recognizing an edge of a magnetic tape, comprising the steps of: providing a read and write unit having a write head and a read head; moving the tape from the write head toward the read head; energizing the write head for writing on the tape; moving the read and write heads so as to approach and cross an edge of the tape; and analyzing for presence or absence of a read signal from the read head and comparing this signal to a reference value so as to determine when the unit has crossed the edge of the tape.

12. A device for recognizing an edge of a magnetic medium, comprising: a read and write system having a write means and a read means on a movable head for respectively writing and reading on a magnetic medium; a transmitter connected to the write means for creating a write signal on the medium and a processing means connected to the read means for receiving a signal from the medium; a control means connected to the head for moving the head toward an edge of the magnetic medium in a direction substantially perpendicular to a running direction of the magnetic medium; means for creating a reference value; and said processing means comparing an output from the read means to said reference value to identify when a write signal is written on the medium by the write means so as to determine an edge of the magnetic medium based upon a change in magnitude of said output from the read means indicative of the head crossing the edge during its movement.

13. A device according to claim 12 wherein the processing means comprises an amplifier means connected to a coil winding of the read means for amplifying the read signal, an output of said amplifier means being connected to a first input of a comparator via a rectifier and a following integrator, and a reference voltage source being connected to a second input of said comparator.

14. A device according to claim 12 wherein the processing means comprises an analog-to-digital converter digitizing an analog read signal from the read means, the read means being connected to an amplifier via a rectifier and an integrator, and a computer means connected to the analog-to-digital converter.

* * * * *